(12) United States Patent
Heuckelbach et al.

(10) Patent No.: US 9,194,723 B2
(45) Date of Patent: Nov. 24, 2015

(54) SYSTEM FOR DAMPING THE REFLECTION WAVE AT THE OPEN END OF A MAGNETOSTRICTIVE SENSOR SYSTEM

(75) Inventors: Rainer Heuckelbach, Lüdenscheid (DE); Joachim Morsch, Marpingen (DE)

(73) Assignee: HYDAC ELECTRONIC GMBH, Saarbruecken (DE)

( * ) Notice: Subject to any disclaimer, the term of this patent is extended or adjusted under 35 U.S.C. 154(b) by 469 days.

(21) Appl. No.: 13/261,297

(22) PCT Filed: Apr. 9, 2010

(86) PCT No.: PCT/EP2010/002231
§ 371 (c)(1),
(2), (4) Date: May 29, 2012

(87) PCT Pub. No.: WO2011/124238
PCT Pub. Date: Oct. 13, 2011

(65) Prior Publication Data
US 2012/0247210 A1    Oct. 4, 2012

(51) Int. Cl.
*H04R 17/00* (2006.01)
*G01D 5/48* (2006.01)
*G10K 11/35* (2006.01)
*H04B 1/03* (2006.01)

(52) U.S. Cl.
CPC .............. *G01D 5/485* (2013.01); *G10K 11/35* (2013.01); *H04B 1/03* (2013.01); *H04R 17/00* (2013.01)

(58) Field of Classification Search
USPC ................................. 367/138, 140
See application file for complete search history.

(56) References Cited

U.S. PATENT DOCUMENTS

| | | | |
|---|---|---|---|
| 5,115,195 A * | 5/1992 | Peterson et al. | 324/207.13 |
| 5,590,091 A | 12/1996 | Gloden et al. | |
| 6,154,975 A * | 12/2000 | Steinich | 33/756 |
| 6,185,155 B1 * | 2/2001 | Steinich | 367/140 |
| 7,239,129 B2 * | 7/2007 | Steinich | 324/207.13 |
| 8,035,372 B2 * | 10/2011 | Garneyer et al. | 324/207.24 |
| 2002/0135359 A1 * | 9/2002 | Steinich | 324/207.13 |
| 2005/0017710 A1 * | 1/2005 | Steinich et al. | 324/207.13 |
| 2005/0132807 A1 * | 6/2005 | Steinich | 73/570 |
| 2005/0200353 A1 * | 9/2005 | Steinich et al. | 324/207.24 |

FOREIGN PATENT DOCUMENTS

| | | |
|---|---|---|
| DE | 103 48 195 A1 | 6/2005 |
| EP | 0 921 373 A2 | 6/1999 |

* cited by examiner

*Primary Examiner* — James Hulka
(74) *Attorney, Agent, or Firm* — Wenderoth, Lind & Ponack, L.L.P.

(57) ABSTRACT

A system for damping the reflection wave at the open end (6) of a magnetostrictive sensor system has at least one magnet device (2) movable relative to a measuring wire (1) that can be deflected mechanically and that experiences a deflection under the influence of a current pulse (3). The deflection can then be processed by a signal device (5). The system has at least one damping part (8) lying against the measuring wire (1) by a sleeve-shaped enclosure (11). The sleeve-shaped enclosure (11) can be deformed from an expanded initial state intended for attaching the sleeve-shaped enclosure to the damping element (9), to a constricted functional state that exerts a clamping force on the damping element (9). The method is characterized in that the sleeve-shaped enclosure (11) is constricted to an increasing extend from the end (19) of the sleeve-shaped enclosure adjacent to the signal device (5) to the other end (19') so that the tubular damping element (9) is likewise pressed into a conical contour. At least the conical contour of the sleeve-shaped enclosure (11) is continuous and without interruption.

10 Claims, 3 Drawing Sheets

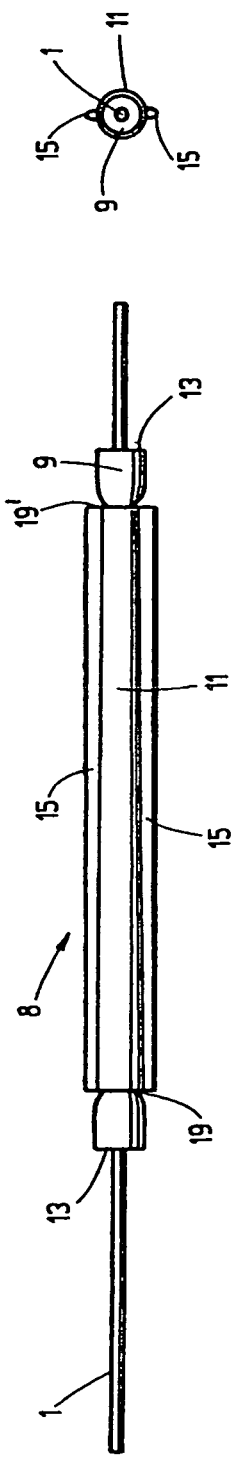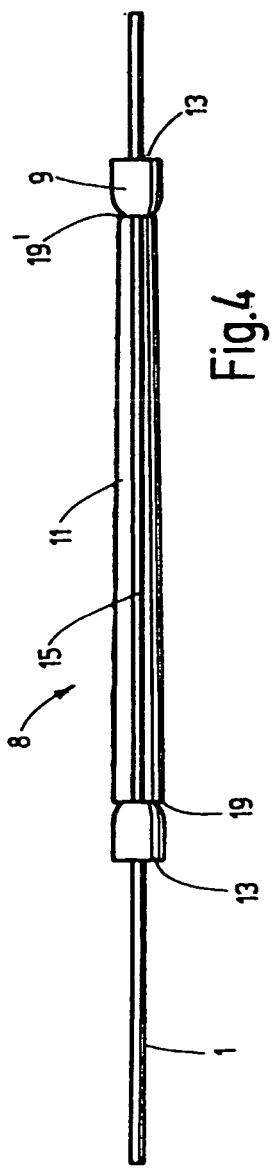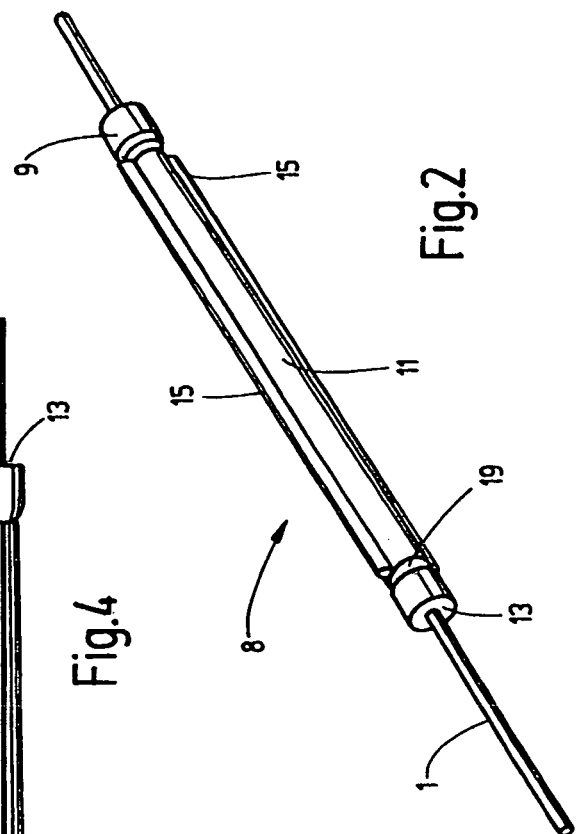

SYSTEM FOR DAMPING THE REFLECTION WAVE AT THE OPEN END OF A MAGNETOSTRICTIVE SENSOR SYSTEM

FIELD OF THE INVENTION

The invention relates to a system for damping the reflection wave at the open end of a magnetostrictive sensor system having at least one magnet device movable relative to a measuring wire that can be deflected mechanically and that experiences, subject to the influence of a current pulse, a deflection that can be processed by a signal device. The system has at least one damping part that rests against the measuring wire at the open end and that has a tubular damping element. The tubular damping element can be clamped to the measuring wire by a sleeve-shaped enclosure. The sleeve-shaped enclosure can be deformed from an expanded initial state for attaching a damping element to a constricted functional state that exerts a clamping force on the damping element.

BACKGROUND OF THE INVENTION

Magnetostrictive sensor systems are known from the prior art. They are used in a wide range of fields as a displacement measurement system or for determining a position. The core piece of such systems is the measuring wire that is made of a special metal alloy and that forms a waveguide. A structure-borne sound wave is generated on this waveguide as a measurement signal. This structure-borne sound wave is induced by the interaction between a permanent magnet, which magnet can be moved along the measuring wire as the position transducer, and a current pulse in the measuring wire. In this way, the structure-borne sound wave is generated as a mechanical pulse that propagates as the torsional and longitudinal wave beginning at the point of origin at the magnet and going in both directions on the waveguide. The position of the magnet along the measuring section, formed by the measuring wire, can be determined by measuring the runtime of this wave from the point of origin at the magnet up to a signal pickup, which signal pickup forms a signal converter.

During the measuring process, the wave is reflected at the ends of the waveguide. Since this reflection interferes with the actual measuring process, it has to be damped by a damping system. For this purpose, the prior art provides the open end with a damping part made of a damping material, for example, a soft material, like synthetic rubber, polyurethane, or any other visco-plastic material. The mounting of such materials is relatively complex. To rectify this problem, DE 103 48 195 A1 discloses a damping system that conforms to the type described in the introductory part and that has a tubular damping element used for the assembly process. This tubular damping element has an expanded initial state, in which it can be easily pushed onto the measuring wire. Then, the damping element can be clampingly locked by a sleeve-shaped enclosure such that it exerts a clamping force on the measuring wire and, as a result, is secured on the measuring wire.

While this approach may simplify the assembly and production process, the tubular damping element and enclosure can be pushed jointly in a loose, non-clamping state, that is, simply and easily, onto the measuring wire. After pushing the damping element and enclosure on the measuring wire, the clamping force is applied to the damping part by a shape change of the enclosure, in order to clamp the damping part to the measuring wire. The prior art system cannot achieve an optimal damping effect.

SUMMARY OF THE INVENTION

An object of the present invention is to provide an improved damping system distinguished by its improved damping effect while retaining the advantages of the simple and cost-effective production.

The present invention basically achieves this object by the sleeve-shaped enclosure being constricted with increasing intensity beginning at the end of the sleeve-shaped enclosure adjacent to the signal device and going in the direction of the other end. The tubular damping element is also then pressed into a conical contour. At least the conical contour of the sleeve-shaped enclosure is continuous and without interruption. In contrast, the prior art solution provides that the sleeve-shaped enclosure is compressed radially at those points that are axially offset from each other, so that individual clamping points are formed, with the penetration depth into the tubular damping element being selected such that it increases from clamping point to clamping point to achieve an increasing damping effect in the direction of the free end of the measuring wire. This intermittent change in the damping effect is disadvantageous. In particular, it is not possible or hardly possible to reproduce the total damping effect with this configuration. In contrast to the prior art solution, the continuous conical contour of the enclosure leads to a correspondingly conical deformation of the tubular damping element, so that its compression does not increase suddenly, but rather uniformly over its length and, in so doing, provides a continuously increasing degree of damping. Since both the degree of conicity and the length of the sleeve-like enclosure can be chosen, an optimal damping can be achieved in a way that is readily repeatable.

In especially advantageous exemplary embodiments, the conicity of the sleeve-shaped enclosure is essentially the same. As a result, a degree of damping can be attained that increases in an especially uniform manner.

Preferably, the tubular damping element extends beyond the two ends of the sleeve-shaped enclosure, and the measuring wire extends outwardly from the respective end of the tubular damping element, especially at both ends of the sleeve-shaped enclosure. This feature allows an electrical contact to be made with the measuring wire even at the open end.

An enclosure in the form of a metal sleeve can be provided in an especially advantageous way. This metal sleeve can be constricted by a plastic, mechanical deformation. The sleeve can be pushed together with the tube piece forming the damping part, loosely over the measuring wire and then deformed in a controlled manner to exert the clamping force on the tubular damping element. Instead of a deformation of the sleeve by mechanical forces, a sleeve made of a shape memory metal can be used, with the sleeve being expanded in the assembly state and assuming a tight shape by heating.

In the case of a mechanically deformed metal sleeve, the sleeve can have at least one longitudinal bead in the constricted functional state, the longitudinal bead is formed by laying a strip of the sleeve wall alongside itself so that two diametrically opposite longitudinal beads can be formed.

The damping element can be formed by a tube made of a soft material, for example, by a tube made of a silicone rubber.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 2 is a perspective view of a damping system according to an exemplary embodiment of the invention that is enlarged by about a factor of 4 over a practical embodiment;

FIGS. 3, 4, and 5 are a top plan view, a side elevational view and a front elevational view, respectively, of the damping system of FIG. 2.

DETAILED DESCRIPTION OF THE INVENTION

Figure 1:
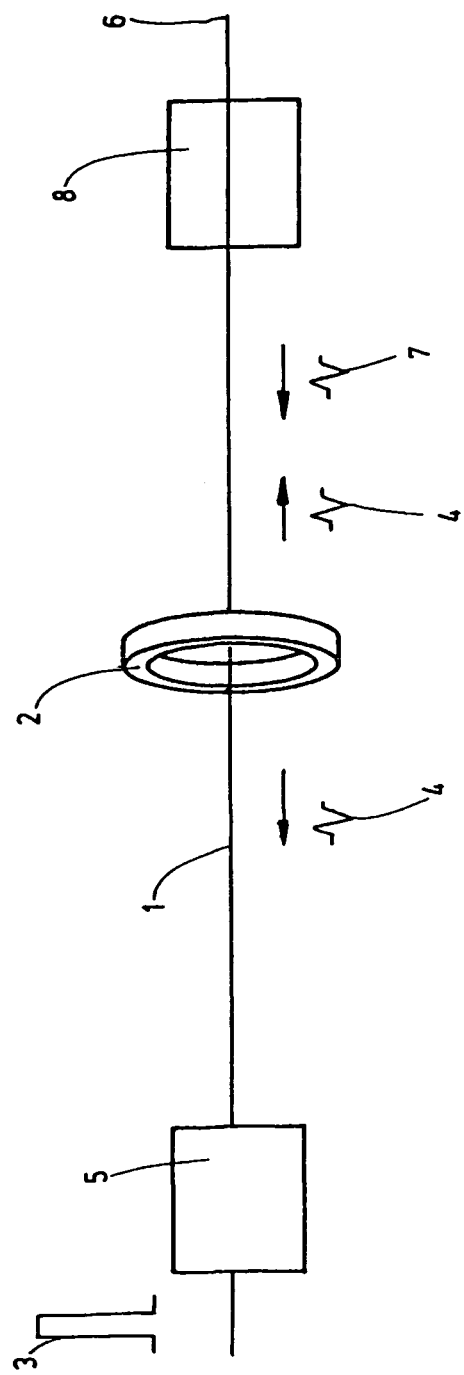
FIG. 1 is a diagrammatic representation explaining the operating mode of a magnetostrictive sensor system.

FIG. 1 shows a measuring wire 1 used as the waveguide and made of a ferromagnetic metal alloy. A permanent magnet 2 can be moved, as the position transducer, along the measuring wire 1. Owing to a current pulse 3 generated in the measuring wire 1, the magnet 2 induces a measuring signal in the form of a structure-borne sound wave 4 that issues from the point of origin at the magnet 2 and that propagates in both directions on the measuring wire 1. To determine the position of the magnet 2, the travel time of the wave 4 up to a signal pickup is measured, where a signal converter 5 is provided. The signal of the signal converter is evaluated by a signal device that is not illustrated. As indicated in FIG. 1, the signal-giving structure-borne sound wave 4 generates a reflection wave 7. To rectify its disturbing influence on the measurement results, the open end 6 of the system has a damping system 8, which damping system is described in detail in conjunction with FIGS. 2 to 6.

FIGS. 2 to 6 show an exemplary embodiment of the damping system 8, in which a longitudinal section of a tube 9 made of silicone rubber is securely clamped on the measuring wire 1. For this purpose, the tube 9 has a metal sleeve 11 in the form of a closed sleeve that is in a hollow-cylindrical shape in the initial state. The hollow cylindrical sleeve 11 extends between its free ends 19 and 19' continuously up to the vicinity of the two ends 13 of the tube 9. FIGS. 2 to 6 show the sleeve 11 in its functional state, in which it is deformed with respect to the initial state. In this deformed functional state, the sleeve 11 is clampingly locked such that each diametrically opposite point has a longitudinal bead 15, which bead extends continuously over the length of the sleeve. This deformation constricts the sleeve 11 to an extent that a clamping force is exerted on the tube 9 to clamp this tube on the measuring wire 1.

Figure 6:
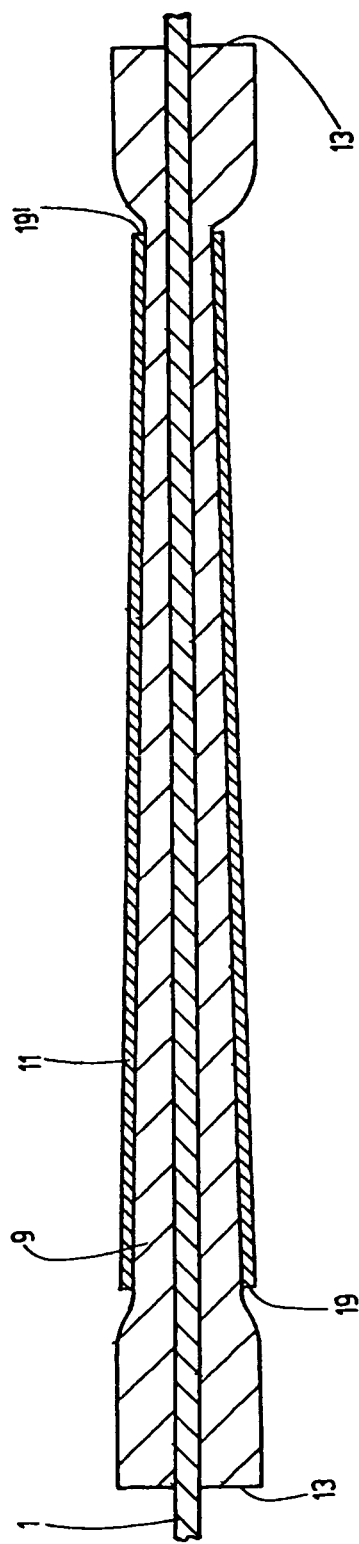
FIG. 6 is a side elevational view in section of the damping system of FIG. 2 that is not drawn to scale and is enlarged even more compared to the illustration of FIG. 4.

As clear from FIGS. 4 and 6, the sleeve 11 is compressed in the functional state such that at one end 19—in the present example, at the end 19 that lies the closest to the signal device 5—the sleeve 11 has a larger diameter than at the other end 19' adjacent to the open end 6 of the system. As a result, the internal tube 9 is compressed such that it assumes a slightly conical shape. Since the compression of the tube 9 varies widely over its length, a variance can be achieved in the degree of damping of the damping part 8. Instead of the conical contour of the tube 9 shown in FIG. 4 from left to right in FIG. 4, the conicity could be reversed as a function of the system properties.

As can be seen most clearly in FIG. 6, the metal sleeve 11 is deformed in the illustrated functional state in such a way that it has a conical contour over its entire length. In this case, the conicity is continuous; that is, it is uninterrupted. As a result, the tube 9, forming the damping element, is increasingly compressed beginning at the end adjacent to the signal device 5 and going in the direction of the free end of the measuring wire 1. The material of the tube 9 is then compressed with continuous increase, so that in turn the degree of damping steadily increases in a continuous manner over the length of the sleeve 11.

In the illustrated exemplary embodiment, the metal sleeve 11 is compressed in such a manner that lateral longitudinal beads 15 are formed. Similarly, the conical constriction could be effected by other measures. An enclosure made of a shape memory material that assumes a constricted shape on raising the temperature could be provided, as stated above.

While one embodiment has been chosen to illustrate the invention, it will be understood by those skilled in the art that various changes and modifications can be made therein without departing from the scope of the invention as defined in the appended claims.

What is claimed is:

1. A system for damping a reflection wave at an open end of a magnetostrictive sensor system, comprising:
   a measuring wire mechanically deflectable and being deflected subject to an influence of a current pulse;
   a magnet device movable relative to said measuring wire;
   a signal device coupled to said measuring wire and processing deflections of said measuring wire;
   a dampening part resting against said measuring wire at an open end of said measuring wire and having a tubular dampening element clamped to said measuring wire by a sleeve-shaped enclosure, said sleeve-shaped enclosure being deformable from an expanded initial state for attaching said sleeve-shaped enclosure to said tubular dampening element to a constricted functional state exerting a clamping force on said tubular dampening element, said sleeve-shaped enclosure having a conical contour and being constricted with increasing intensity beginning at a first free end thereof adjacent said signal device in a direction of an opposite second free end of said sleeve-shaped enclosure pressing said tubular dampening element into a conical contour, said conical contour of said sleeve-shaped enclosure being continuous and being without interruption, said tubular dampening element also being pressed into said conical contour thereof over an entire length of said sleeve-shaped enclosure, said sleeve-shaped enclosure and said tubular dampening element having essentially same conicities.

2. A system according to claim 1 wherein
said tubular dampening element extends beyond said first and second ends of said sleeve-shaped enclosure.

3. A system according to claim 1 wherein
said measuring wire extends outwardly from ends of said tubular dampening element at the respective first and second ends of said sleeve-shaped enclosure.

4. A system according to claim 1 wherein
said sleeve-shaped enclosure comprises a metal sleeve constricted by a plastic, mechanical deformation thereof.

5. A system according to claim 4 wherein
said metal sleeve comprises at least a first longitudinal bead in the constricted functional state, said first longitudinal bead being formed by laying a wall of said metal sleeve alongside itself.

6. A system according to claim 5 wherein
said metal sleeve comprises a second longitudinal bead diametrically opposite said first longitudinal bead in the constricted state, said second longitudinal bead being formed by laying a wall of said metal sleeve alongside itself.

7. A system according to claim 6 wherein
said first and second longitudinal beads extend over an entire length of said metal sleeve.

8. A system according to claim 1 wherein said tubular dampening element comprises a tube of soft material.

9. A system according to claim 8 wherein said soft material comprises a silicone rubber.

10. A system according to claim 1 wherein said sleeve-shaped enclosure and an entire portion of said tubular dampening element within said sleeve-shaped enclosure taper at respective constant angles.

* * * * *